M. WALKER.
DYNAMO ELECTRIC MACHINE.
APPLICATION FILED MAY 16, 1910.
1,156,645.
Patented Oct. 12, 1915.
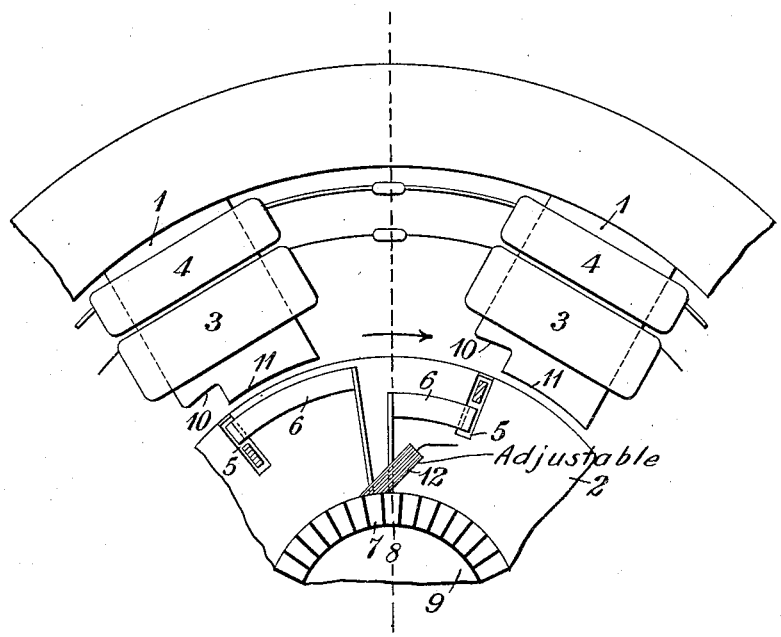

UNITED STATES PATENT OFFICE.

MILES WALKER, OF HALE, ENGLAND, ASSIGNOR TO WESTINGHOUSE ELECTRIC AND MANUFACTURING COMPANY, A CORPORATION OF PENNSYLVANIA.

DYNAMO-ELECTRIC MACHINE.

1,156,645. Specification of Letters Patent. Patented Oct. 12, 1915.

Application filed May 16, 1910. Serial No. 561,749.

*To all whom it may concern:*

Be it known that I, MILES WALKER, a subject of the King of Great Britain, and a resident of Hale, in the county of Chester, England, have invented a new and useful Improvement in Dynamo-Electric Machines, of which the following is a specification.

My invention relates to dynamo electric machines and particularly to rotary converters and motor generators, and it has for its object to provide a machine of this character in which the voltage generated at the direct current brushes of the machine may be varied while the voltage on its alternating current side remains constant.

It is well known that, if the direct current brushes of a rotary converter or motor-generator are rocked either forward or backward from the neutral position, the voltage across them is decreased, but, in machines, as commonly constructed, it is not possible to vary the direct current voltage in this manner through a very wide range because movement of the brushes a considerable distance from the neutral position produces serious sparking.

According to my present invention, the strength of the magnetic field under the poles or parts of the poles, and the length and resistance of the conductors connecting two adjacent commutator bars are so proportioned that it is possible to rock the brushes over a wide arc without causing sparking. I am, therefore, able to obtain a wide variation of voltage on the direct current side of the machine by rocking the brushes forward or backward.

For the purpose of explanation, the pole arc may be regarded as divided into two parts and a region under each pole which is spanned by the first part of the pole arc, when taken in the direction of rotation, will be considered. This region of the pole face has ordinarily a magnetic flux passing through it of such polarity as to generate, in the conductors moving under it, an electromotive force which is in the right direction to commutate the current generated in the armature. If the above mentioned magnetic flux has its proper value, conductors connected to the commutator bars upon which the brushes rest when rocked into their forward position will have generated therein an electro-motive force which is of the proper value to produce perfect commutation. If narrow carbon brushes are used or if resistances are inserted into the circuits which would ordinarily be short-circuited by the brushes, it is possible to have quite a large variation in the strength of the above mentioned flux and yet obtain fairly good commutation. Moreover, it is possible to have the flux of the right strength to produce good commutation at full load and yet to have the electro-motive force produced in the short-circuited conductors not so great as to produce sparking at no load.

According to my present invention, the length of the air-gap in the first part, or leading pole tip of the above mentioned pole arc, and the number of ampere turns magnetizing it are so arranged as to produce the right strength of field to bring about these conditions, while the length of the air-gap of the remainder of the pole arc and the number of ampere turns upon it are arranged to meet other conditions in the design.

In order that the invention may be clearly understood, a practical embodiment of the same is illustrated in the single figure of the accompanying drawing, which is a view, in end elevation, of a portion of the field magnet and armature of a rotary converter.

Referring now to the drawing, the field magnet pole pieces of a rotary converter or motor-generator are indicated at 1 and the armature core at 2, the former being provided with a shunt field winding 3 and a series field winding 4, and the latter being provided with the usual slots 5 for the reception of the armature coils, the conductors of one of which are indicated at 6. The terminals of the conductors 6 are connected to the segments 7 and 8, respectively, of the commutator cylinder 9 which are shown in contact with one of the brushes 12 of the machine.

The face of each pole piece 1 is divided into two portions 10 and 11, the former of which—referred to hereinafter as the "first" or "leading" portion, that is to say, the portion under which each armature conductor first passes during its rotation—is cut away so that the air gap between said portion and the armature core 2 is much greater than the air gap between the "second" or remaining portion of the pole face and the armature core.

It will be evident that the magnetic reluctance of the air gap, taken over any area extending the full active length of the armature, that is, the full length of the pole in a direction parallel with the axis of the armature and measuring one centimeter along the periphery, will be much greater under the first or "leading" portion 10 of the pole than the magnetic reluctance of the air gap measured over any like area under the second portion 11 of the pole. The magnetic reluctance of the areas measured in this way will, however, be substantially uniform under each portion of the pole. The effect of this arrangement is that the electromotive force generated in the armature conductors moving under the leading portion of the pole will not be sufficient to cause sparking when these conductors are short-circuited by brushes touching adjacent commutator segments. The brushes may therefore be rocked to any position within limits corresponding to the extent of the first portion of the pole while, at the same time, the magnetic flux through the second portion of the pole may be made as great as is necessary to secure the required output from the machine. It is clear, therefore, that a wide range of direct current voltage, corresponding to the above-mentioned possible extent of displacement of the brushes, may thus be obtained while maintaining good commutating conditions. For example, if it is required to obtain a variation in the direct current voltage amounting to 20% of the mean voltage of the machine, the relative reluctance of the air gaps under the portions 10 and 11 of each pole is so designed that the flux passing through the portion 10 of the pole is 10% of the flux passing through the portion 11. The total flux through the whole pole face is thus equal to 110% of that required to generate the mean electro-motive force at the brushes, so that, when the brushes are touching conductors on the true neutral axis, indicated in dotted lines midway between the axes of adjacent poles, a voltage at the brushes is obtained which is 10% higher than the mean voltage. By rocking the brushes forward in the direction of rotation of the armature from the neutral axis, so that the flux through the portion 10 of one pole face generates an electro-motive force opposed to that produced by the flux through the portion 11 of the adjacent pole face, a voltage at the brushes is obtained which is 10% less than the mean voltage.

So far as the operation of the machine from the alternating current side is concerned, very little, if any, change is made by the above described displacement of the brushes, since the total flux through the whole pole remains unaltered by such displacement. It is, therefore, possible to change the voltage on the direct current side throughout a wide range and yet maintain the power factor on the alternating current side at any desired value.

I find it preferable to employ narrow carbon brushes of high resistance or to insert resistances into the leads which connect the armature winding to the commutator segments in order to reduce the current flowing in the portions of the armature winding which are momentarily short-circuited when the commutator segments connected thereto are under the said brushes.

The invention may evidently be applied to any direct current machine, and, by having two or more sets of brushes, a corresponding number of different voltages may be obtained from the same machine. These and other variations of the constructional forms of the invention herein described and illustrated may evidently be made without exceeding the scope thereof. If the machine is run as a direct current motor or as a rotary converter from direct current to alternating current the arrow indicating the direction of rotation in the drawing will be reversed.

I claim as my invention:

1. In a direct current or double current dynamo electric generator, the combination with an armature, a commutator cylinder to which the armature coils are connected, and a set of adjustable brushes, of a field magnet, the polar projections of which are divided in a line parallel to the axis of the armature into two unequal well defined portions to provide a greater air gap under the smaller portion located under the leading pole tip than under the remaining larger portion of the pole face.

2. In a dynamo-electric machine, the combination with an armature, a commutator cylinder to which the armature coils are connected, and an adjustable set of brushes, of a field magnet the polar projections of which are divided in a line substantially parallel to the axis of the armature into two well defined portions having air-gaps of different lengths, the portion having the longer air-gap being disposed on the side of the polar projection approached by the armature when the machine is operated as a generator.

3. In a dynamo-electric machine, the combination with an armature, a commutator cylinder to which the armature coils are connected, and an adjustable set of brushes, of a field magnet having a plurality of polar projections severally provided with well defined zones of different flux densities, the zone of the lower density being disposed under the leading pole tip when the machine is operated as a generator.

4. In a dynamo-electric machine, the combination with an armature, a commutator cylinder to which the armature coils are connected, and an adjustable set of brushes, of a field magnet having polar projections that are severally recessed under the leading pole tip to produce a weak uniform magnetic field under that portion of the projection through which the conductors move when the brushes make contact with their corresponding commutator segments.

5. In a rotary converter, the combination with a rotatable armature having a commutator cylinder, and a field magnet structure having zones of relatively weak flux density under the leading pole tips, of a set of brushes coöperating with the commutator cylinder and adapted for adjustment within said zones of weak flux density, whereby the direct-current voltage may be varied.

In testimony whereof, I have hereunto subscribed my name this twenty-eighth day of April 1910.

MILES WALKER.

Witnesses:
A. G. SKELTON,
J. C. BOUTFLOWER.